(12) United States Patent
Barber et al.

(10) Patent No.: US 7,945,967 B2
(45) Date of Patent: May 24, 2011

(54) METHOD AND APPARATUS FOR MOUNTING A VISION SYSTEM

(75) Inventors: Ross F. Barber, Pembroke, NH (US); Ronald W. Ciccone, Jr., Bedford, NH (US)

(73) Assignee: L-3 Insight Technology Incorporated, Londonderry, NH (US)

( * ) Notice: Subject to any disclaimer, the term of this patent is extended or adjusted under 35 U.S.C. 154(b) by 985 days.

(21) Appl. No.: 11/775,946

(22) Filed: Jul. 11, 2007

(65) Prior Publication Data

US 2008/0020720 A1    Jan. 24, 2008

Related U.S. Application Data

(60) Provisional application No. 60/807,725, filed on Jul. 19, 2006.

(51) Int. Cl.
*A42B 3/00* (2006.01)
(52) U.S. Cl. .................................. 2/6.2; 2/422
(58) Field of Classification Search .............. 2/6.2, 6.7, 2/422, 10, 453, 424, 6.3; 359/409, 815; 250/214 VT
See application file for complete search history.

(56) References Cited

U.S. PATENT DOCUMENTS

| | | | |
|---|---|---|---|
| 4,449,787 A | 5/1984 | Burbo et al. | |
| 4,689,834 A | 9/1987 | McCarthy et al. | |
| 5,176,342 A | 1/1993 | Schmidt et al. | |
| 5,226,181 A | 7/1993 | Polednak et al. | |
| 5,331,684 A | 7/1994 | Baril et al. | |
| 5,347,119 A | 9/1994 | Connors | |
| 5,408,086 A | 4/1995 | Morris et al. | |
| 5,467,479 A | 11/1995 | Mattes | |
| 5,469,578 A | 11/1995 | Mattes | |
| 5,471,678 A | 12/1995 | Dor | |
| 5,506,730 A | 4/1996 | Morley et al. | |
| 5,535,053 A * | 7/1996 | Baril et al. | 359/409 |
| 5,542,627 A | 8/1996 | Crenshaw et al. | |
| 5,648,862 A | 7/1997 | Owen | |
| 5,703,354 A | 12/1997 | Wannagot et al. | |
| 5,914,816 A | 6/1999 | Soto et al. | |
| 6,457,179 B1 | 10/2002 | Prendergast | |
| 6,472,776 B1 | 10/2002 | Soto et al. | |
| 6,751,810 B1 | 6/2004 | Prendergast | |
| 6,862,748 B2 | 3/2005 | Prendergast | |
| 6,938,276 B1 | 9/2005 | Prendergast | |
| 6,957,449 B2 | 10/2005 | Prendergast | |
| 6,986,162 B2 | 1/2006 | Soto et al. | |
| 7,418,738 B2 | 9/2008 | Prendergast | |
| 7,444,683 B2 | 11/2008 | Prendergast et al. | |
| 7,504,918 B2 | 3/2009 | Prendergast et al. | |
| 2007/0012830 A1 | 1/2007 | Prendergast | |
| 2007/0068058 A1* | 3/2007 | Remo | 42/122 |
| 2007/0152406 A1 | 7/2007 | Prendergast et al. | |
| 2008/0184462 A1 | 8/2008 | Prendergast | |
| 2008/0272868 A1 | 11/2008 | Prendergast et al. | |
| 2009/0077721 A1 | 3/2009 | Prendergast | |
| 2009/0135479 A1 | 5/2009 | Soto et al. | |
| 2009/0268288 A1 | 10/2009 | Prendergast | |
| 2010/0067126 A1 | 3/2010 | Prendergast | |

* cited by examiner

*Primary Examiner* — Shaun R Hurley
*Assistant Examiner* — Andrew W Sutton

(57) ABSTRACT

A bridge assembly couples a vision system to a helmet or headgear to allow a user to alternatively align an eyepiece of the vision system in front of a left or right eye of a user. The bridge assembly includes a receiver for removably mounting the vision system. The receiver is coupled to a slide assembly providing side-to-side movement of the vision system relative to the helmet.

20 Claims, 6 Drawing Sheets

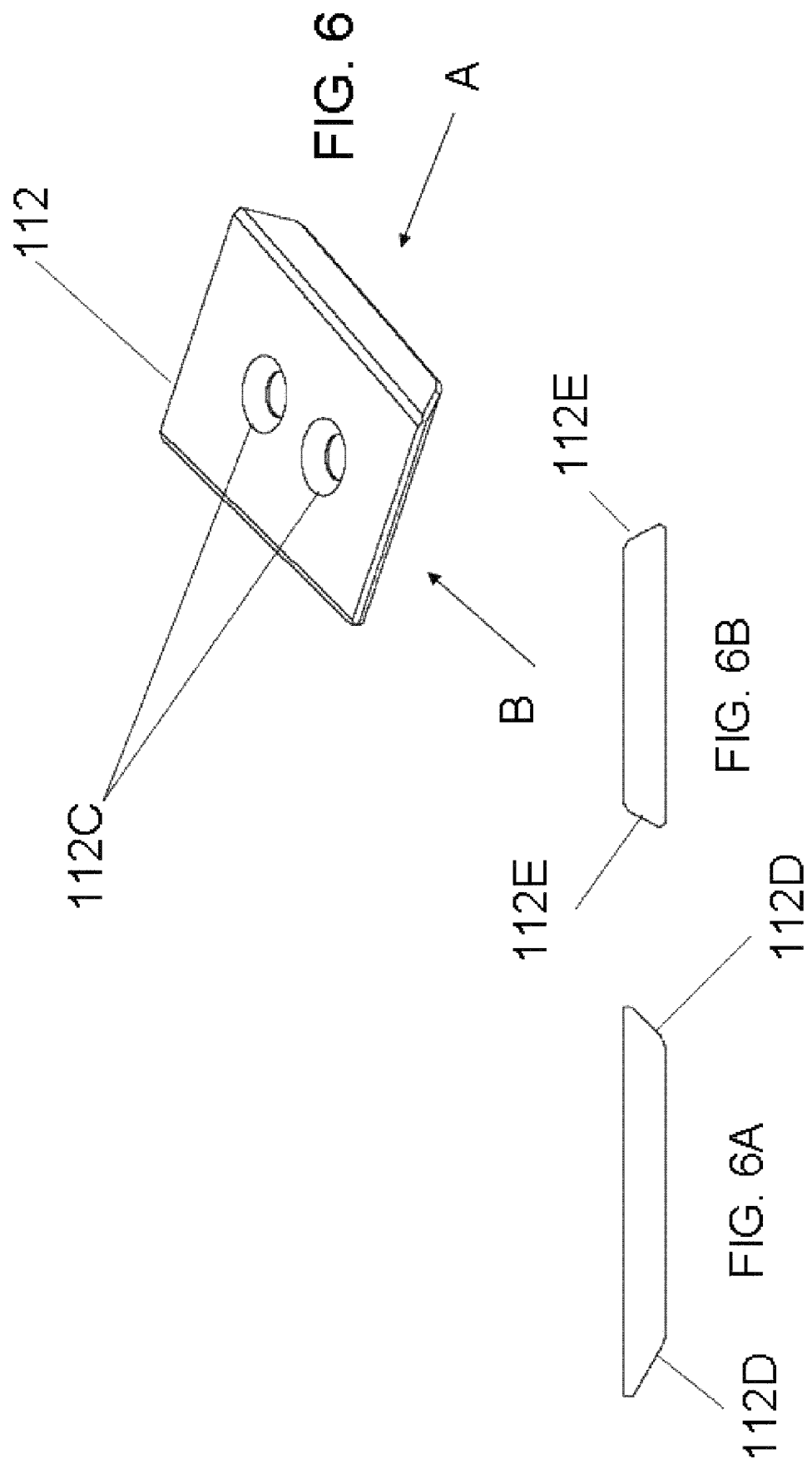

METHOD AND APPARATUS FOR MOUNTING A VISION SYSTEM

CROSS-REFERENCE TO RELATED APPLICATIONS

This application claims the benefit of U.S. provisional patent application Ser. No. 60/807,725 filed Jul. 19, 2006. The entire disclosure of which is incorporated herein by reference in its entirety.

BACKGROUND

Vision systems, such as night or low light vision systems, include image intensification, thermal imaging, and fusion monoculars, binoculars, bioculars, and goggles, whether hand-held, weapon mounted, or helmet mounted. In a helmet mounted configuration, the helmet may include a helmet mount fixed thereto for removably receiving an associated mount affixed to the vision system. Both the helmet mount and the vision system mount may be configured to allow for fit and location adjustment of the vision system. For example, the helmet and vision system mounts combined may allow vertical adjustment, fore and aft adjustment, interpupilary distance adjustment, tilt adjustment, and may allow rotation of the vision system to a stowed area adjacent a top surface of the helmet.

BRIEF DESCRIPTION OF THE DRAWINGS

For a better understanding of the present invention, together with other objects, features and advantages, reference should be made to the following detailed description, which should be read in conjunction with the following figures wherein:

FIG. 6 is an isometric view, FIG. 6A is a side view taken along line A and FIG. 6B is a side view taken along line B of a mount consistent with one embodiment of the present invention.

DETAILED DESCRIPTION

Figure 1:
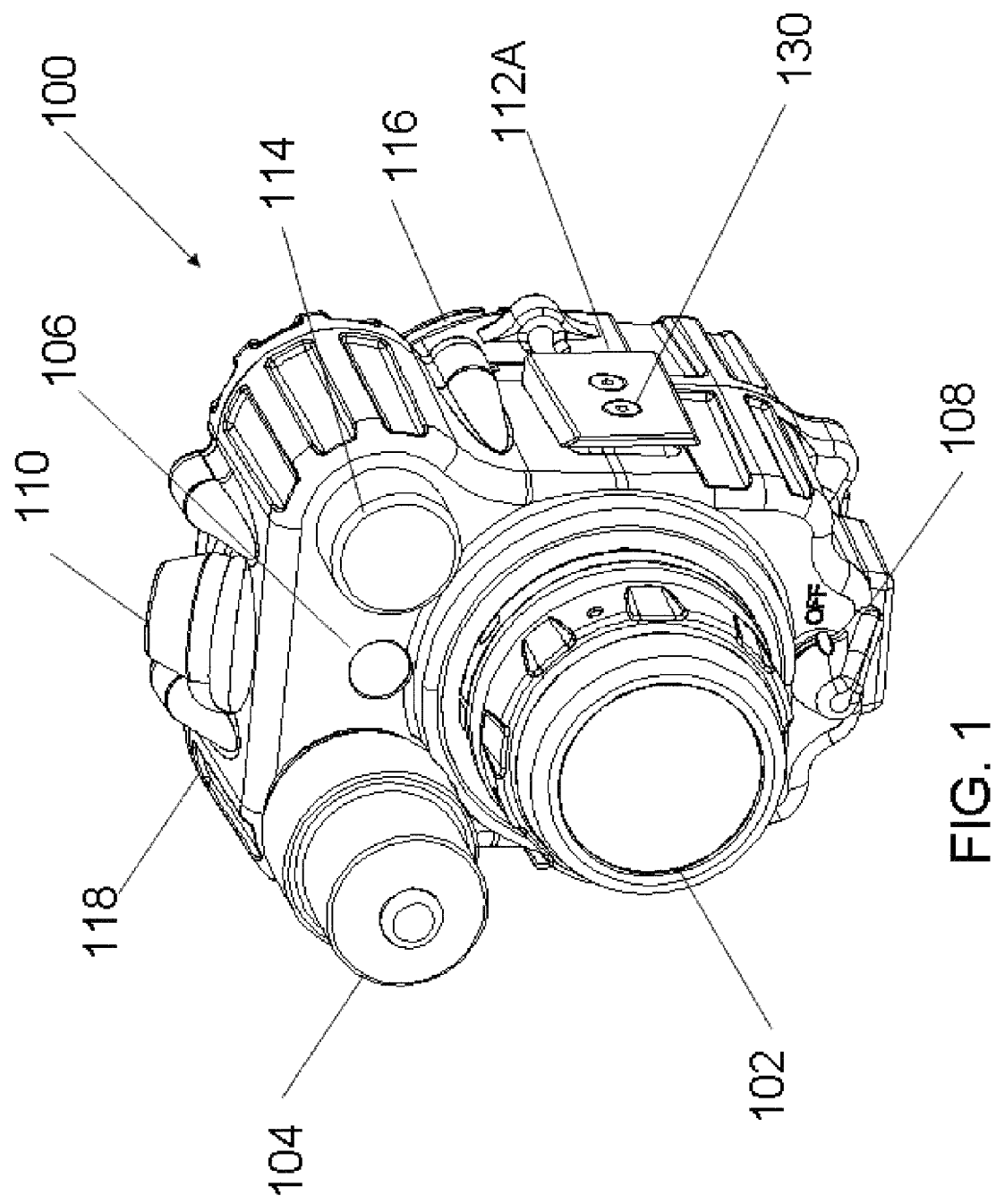
FIG. 1 is an isometric view of a vision system consistent with one embodiment of the present invention.
Figure 2:
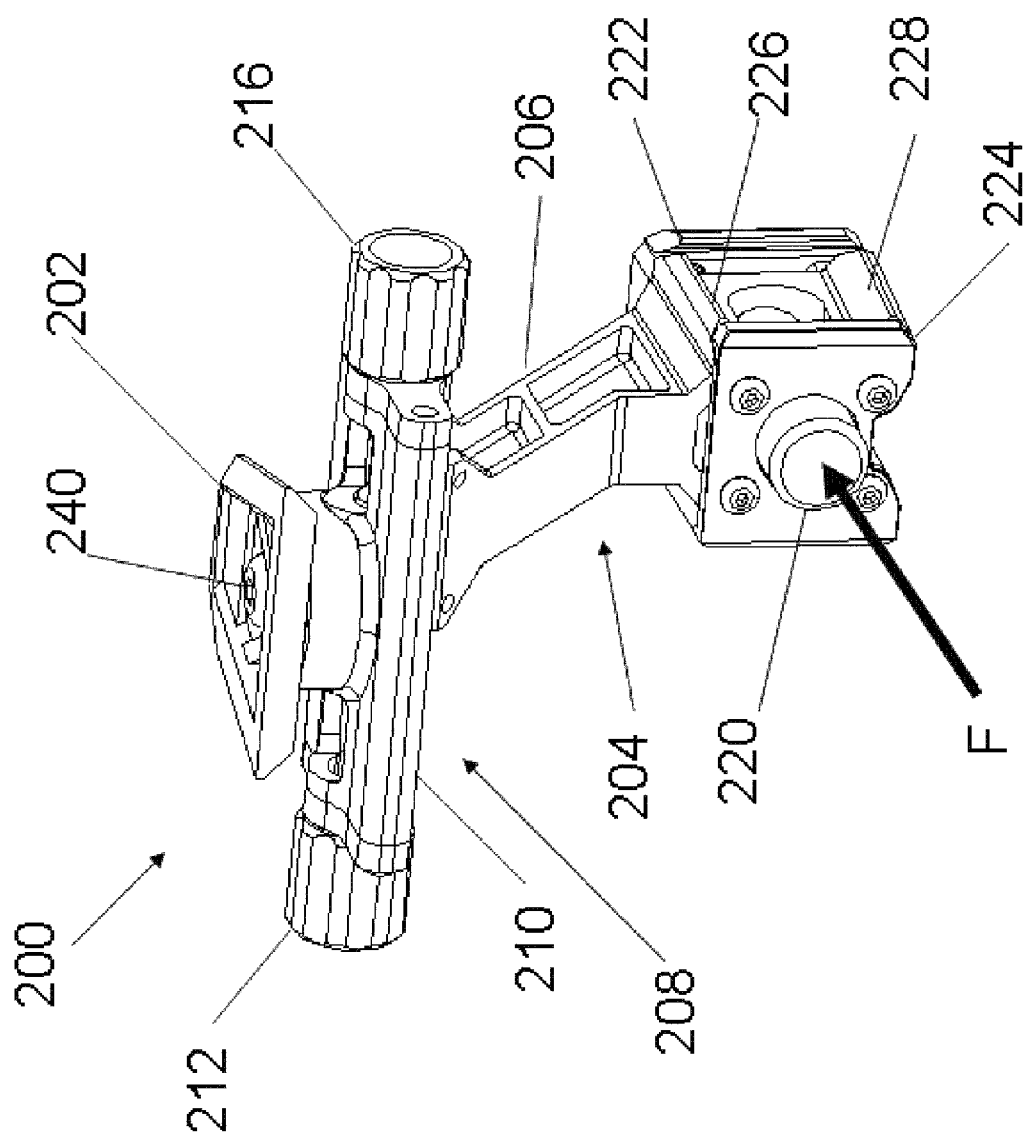
FIG. 2 is an isometric view of a bridge assembly consistent with one embodiment of the present invention.
Figure 3:
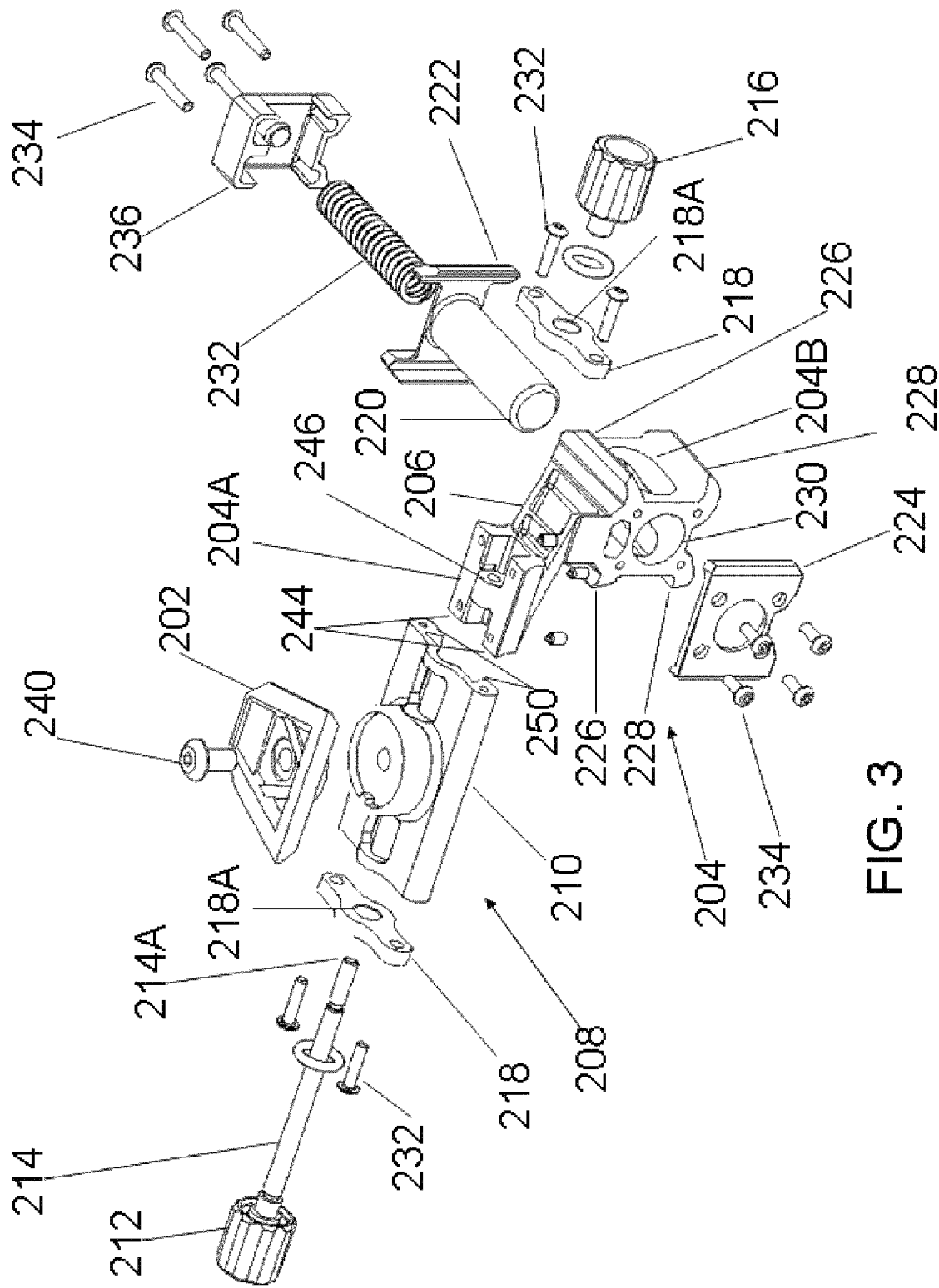
FIG. 3 is an exploded isometric view of the bridge assembly of FIG. 2.

FIG. 1 is an isometric view of a vision system 100 consistent with one embodiment of the present; FIG. 2 is an isometric view of a bridge assembly 200 consistent with one embodiment of the present invention; and FIG. 3 is an exploded isometric view of the bridge assembly of FIG. 2. The vision system 100 may include an image intensification or thermal imaging objective assembly 102, a removable battery cap 104, an illuminator 106, a selector 108, an input/output connector 110, a mount 112A, and a gain adjuster 114 enclosed in a housing 118. The vision system 100 may be powered by an internal or external battery. The objective assembly 102 may be rotated to focus on an item, person, or area of interest. The illuminator 106 may project visible or invisible light in a narrow or wide beam forward of the vision system 100. The selector 108 may be used to turn the vision system 100 ON and OFF, place it in a sleep mode, or turn the illuminator ON and OFF. The connector 110 may be used to transmit or receive data or to provide power to the vision system 100 from a separate battery pack. The vision system 100 may be configured as a monocular with processing electronics sealed within the housing 118 to protect the electronics from contaminants and water.

The mount 112A may be coupled to a first side of the housing 118 of the vision system 100 and a second mount 112B (see FIG. 5) may be coupled to a second side of the housing 118 using one or more fasteners 130. The mounts 112A and 112B may allow the vision system 100 to be mounted in front of a right or left eye of a user. The mounts 112A, 112B may have a profile (e.g. dovetail) that allows them to be removably coupled to the bridge assembly 200.

The vision system 100 may have an eyepiece 116 through which a user can view an item, person, or area of interest. The vision system 100 may have an onboard compass and/or a positioning system and the heading and/or the position of the user may be viewable through the eyepiece 116. The vision system 100 may send snap shots or video observed through the objective assembly 102, and/or distance to target information, and/or heading, and/or location through a cable coupled to the connector 110. Alternatively, the snap shots or video, heading, and position may be stored onboard for later viewing.

The bridge assembly 200 may have a helmet mount 202, an adjustment assembly 208, and a receiver assembly 204. The helmet mount 202 may be sized to cooperate with and be removably coupleable to a mount receiver secured to a helmet or other headgear for example a PVS-15/NVB-15-A helmet mount assembly. The helmet mount 202 may be coupled to the adjustment assembly 208 with a fastener 240.

The receiver assembly 204 may have an upper portion 204A that is sized to be slidably coupled to the adjustment assembly 208, a lower portion 204B having a laterally extending opening 230 extending generally parallel to upper lips 226 and lower lips 228, and a stem portion 206. The upper portion 204A may have a pair of parallel rails 244 and a threaded portion 246 extending parallel to the rails. A front jaw 224, an actuator 220 fixed to a rear jaw 222, a rear cover 236, and a spring 232 may be coupled to the lower portion 204B with one or more fasteners 234. The spring 232 may be any type of spring, including, but not limited to, compression, tension, cantilever, leaf, conical, and belleville. The rear jaw 222 may be slidably coupled to the rear cover 236. The actuator 220 may be depressed with a force F or rotated to cause rear jaw 222 to move relative to the front jaw 224 so the user can couple or decouple the vision system 100 to the bridge assembly 200. The jaws 222, 224 may have a profile that cooperates with the mounts 112A, 12B on the vision system 100 to couple the vision system 100, through the bridge assembly 200 to a helmet or headgear.

The adjustment assembly 208 may have a middle structure 210 having a pair of parallel rails 250 sized to cooperate with the rail 244 of the upper portion 204A, a first adjuster knob 212 on a shaft 214, a second adjuster knob 216 coupled to an end 214A of shaft 214, and end stops 218. The end stops 218 may be coupled to the middle structure 210 with fasteners 232 and have openings 218A sized to allow shaft 214 to extend therethrough. The first adjuster knob 212 or the second adjuster knob 216 may be rotated to allow the receiver assembly 204 to be moved left-to-right relative to the middle structure 210 to allow the user to place the eyepiece 116 of the vision system 100 properly in front of their viewing eye.

Figure 4:
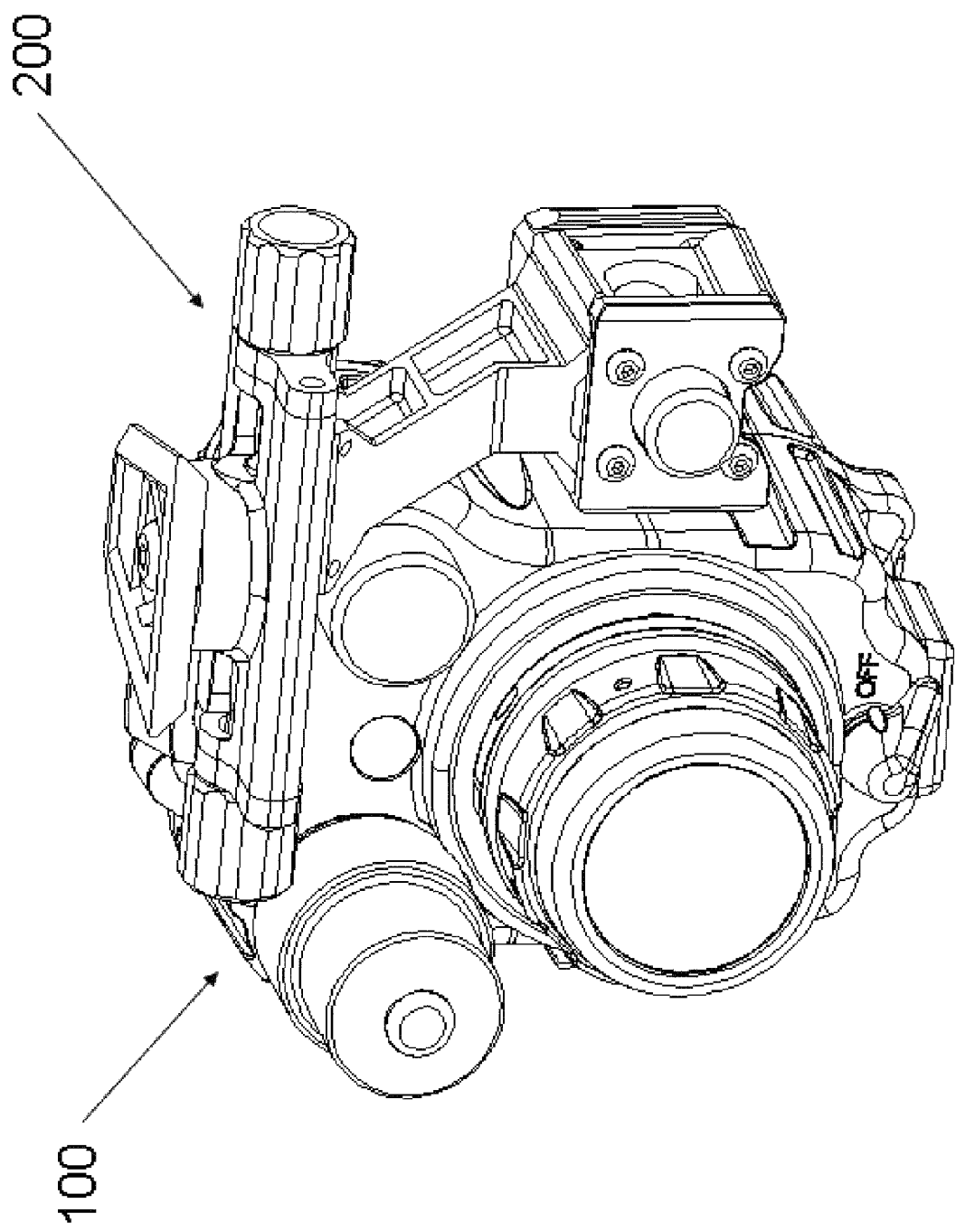
FIG. 4 is an isometric view of the vision system of FIG. 1 coupled to the bridge assembly FIG. 2, in a first position.
Figure 5:
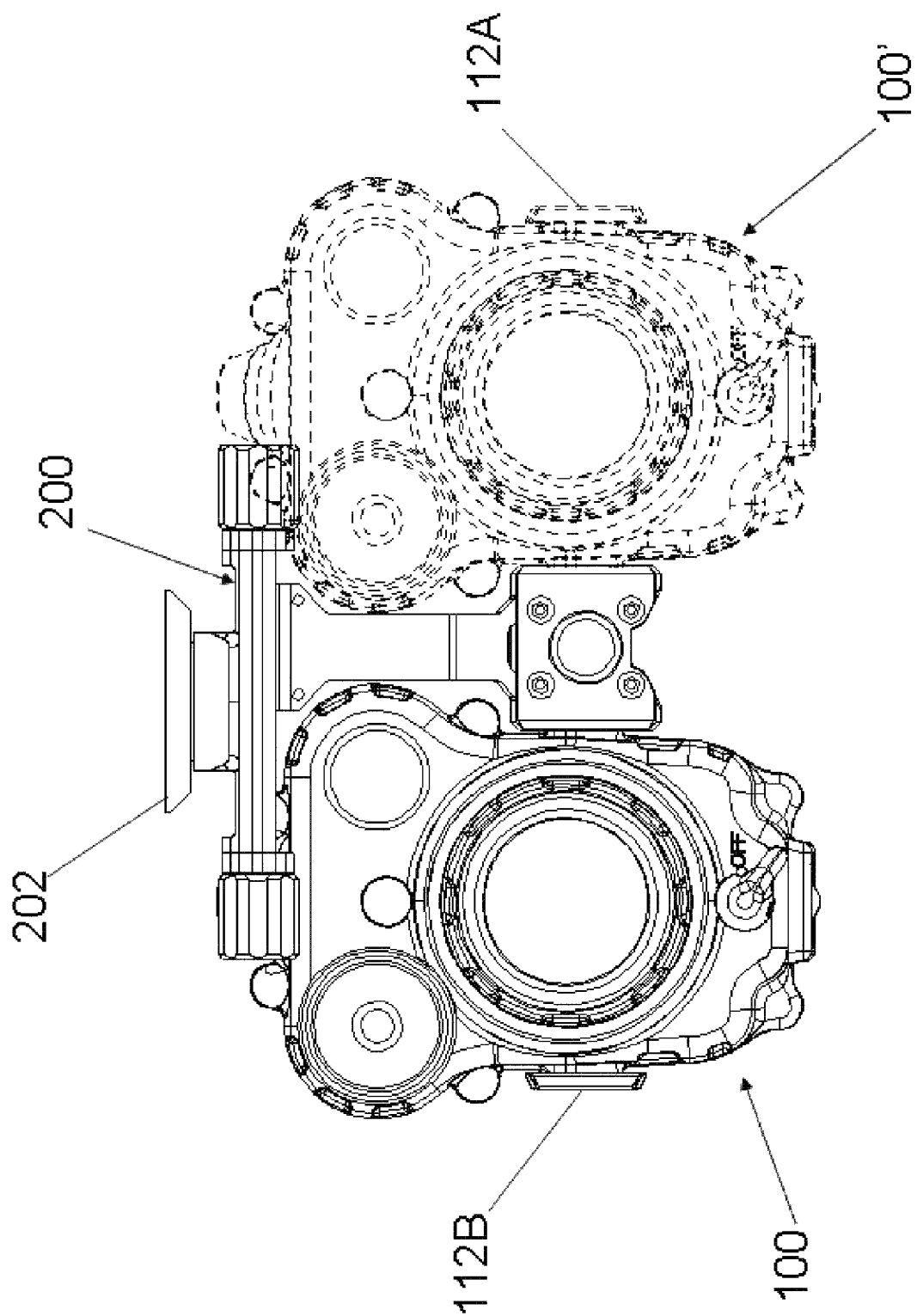
FIG. 5 is a front view showing the vision system of FIG. 1 coupled to the bridge assembly of FIG. 2 in alternate first and second positions.

FIG. 4 is an isometric view of the vision system 100 of FIG. 1 coupled to the bridge assembly 200 of FIG. 2, in a first position and FIG. 5 is a front view showing the vision system 100 of FIG. 1 coupled to the bridge assembly 200 of FIG. 2 in alternate first and second positions. As shown in FIG. 5, the mount 112A may be coupled between lips 226, 228 and front jaw 224 and rear jaw 222 to position the vision system 100 in front of the right eye of the user and mount 112B may be coupled between lips 226, 228 and front jaw 224 and rear jaw 222 to position the vision system 100' in front of the left eye of the user. Attachment and removal of the vision system 100 from the receiver assembly 204B may be accomplished with one hand.

FIG. 6 is an isometric view, FIG. 6A is a side view taken along line A and FIG. 6B is a side view taken along line B of a mount 112 consistent with one embodiment of the present invention. The mount 112 may have one or more holes 112C extending therethrough for securing the mount 112 to the vision system 100. The mount 112 may have a dovetail profile having sloped surfaces 112D and 112E.

According to one aspect, the present disclosure may provide a bridge assembly for securing a vision system to a helmet or headgear having a helmet mount, an adjustment assembly, and a receiver assembly. The helmet mount being sized to cooperate with a helmet or headgear receiver. The adjustment assembly having a pair of parallel rails and a rotatable shaft parallel to the rails. The receiver assembly having a receiver having a pair of receiver rails slidably cooperating with the rails on the adjustment assembly, a threaded portion extending parallel to the receiver rails, a first jaw coupled to the receiver, an actuator fixed to a second jaw and slidable in a direction generally perpendicular to the receiver rails, and a spring for biasing the second jaw towards the first jaw.

According to yet another aspect, the present disclosure may provide a bridge assembly for securing a vision system to a helmet or headgear having a helmet mount, a slide assembly, and a receiver assembly. The helmet mount being sized to cooperate with a helmet or headgear receiver. The slide assembly coupled to helmet mount and configured for adjusting said vision system in a first direction. The receiver assembly having a receiver slidably coupled to the slide assembly, a first jaw, an actuator fixed to a second jaw and slidable in a direction generally perpendicular to the first direction, and a spring for biasing the second jaw towards the first jaw.

According to yet another aspect, the present disclosure may provide a vision system securable to a helmet or headgear receiver having a vision system housing, a helmet mount, an adjustment assembly, and a receiver assembly. The vision system housing having a first vision mount fixed to a first side of the housing, a second vision mount fixed to a second and opposing side of the housing, and an eyepiece disposed between the first and second mounts. The helmet mount sized to cooperate with the helmet or headgear receiver and coupled to the adjustment assembly, the adjustment assembly having a pair of parallel rails and a rotatable shaft parallel to the rails. The receiver assembly having a receiver having a pair of receiver rails slidably cooperating with the rails on the adjustment assembly, a threaded portion extending parallel to the receiver rails, a first jaw and a third jaw coupled to the receiver, an actuator fixed to a second jaw and a fourth jaw and slidable in a direction generally perpendicular to the receiver rails, and a spring for biasing the second and fourth jaws towards the first and the third jaws. The first vision mount may be coupled between the first jaw and the second jaw to align the eyepiece assembly with a left eye of a user and the second vision mount may be coupled between the third jaw and the fourth jaw to align the eyepiece assembly with a right eye of a user.

Although several embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed is:

1. A bridge assembly for securing a vision system to a helmet or headgear, comprising:
   a helmet mount sized to cooperate with a helmet or headgear receiver;
   an adjustment assembly coupled to the helmet mount, the adjustment assembly having a pair of parallel rails and a rotatable shaft parallel to the rails; and
   a receiver assembly having a receiver having a pair of receiver rails slidably cooperating with the rails on the adjustment assembly, a threaded portion extending parallel to the receiver rails, a first jaw and a third jaw coupled to the receiver, an actuator fixed to a second jaw and a fourth jaw and slidable in a direction generally perpendicular to the receiver rails, and a spring for biasing the second jaw towards the first jaw.

2. The bridge assembly of claim 1, wherein the receiver has an upper lip and a lower lip extending generally perpendicular to the receiver rails.

3. The bridge assembly of claim 1, wherein the first jaw and the second jaw have a profile that cooperates with a vision mount on a vision system.

4. The bridge assembly of claim 1, wherein the rotatable shaft has an externally threaded portion that cooperates with the threaded portion of the receiver.

5. The bridge assembly of claim 1, wherein the rotatable shaft has a first knob at a first end for allowing a user to move the receiver assembly relative to the adjustment assembly.

6. The bridge assembly of claim 5, wherein the rotatable shaft has a second knob at a second end for allowing a user to move the receiver assembly relative to the adjustment assembly.

7. The bridge assembly of claim 1, wherein the adjustment assembly has a first and a second end stop to limit travel of the receiver assembly.

8. The bridge assembly of claim 7, wherein the first and the second end stops each have an opening through which the rotatable shaft extends.

9. A bridge assembly for securing a vision system to a helmet or headgear, comprising:
   a helmet mount sized to cooperate with a helmet or headgear receiver;
   a slide assembly coupled to helmet mount and configured for adjusting said vision system in a first direction; and
   a receiver assembly having a receiver slidably coupled to the slide assembly, a first jaw and a third jaw, an actuator fixed to a second jaw and a fourth jaw and slidable in a direction generally perpendicular to the first direction, and a spring for biasing the second jaw and fourth jaw towards the first jaw.

10. The bridge assembly of claim 9, wherein the slide assembly comprises a first set of slidably cooperating rails and a first lead screw for moving said receiver assembly in a first direction.

11. The bridge assembly of claim 9, wherein the receiver has an upper lip and a lower lip extending generally perpendicular to the receiver rails.

12. The bridge assembly of claim 9, wherein the first jaw and the second jaw have a profile that cooperates with a vision mount on a vision system.

13. The bridge assembly of claim 9, wherein the adjustment assembly has a first and a second end stop to limit travel of the receiver assembly.

14. The bridge assembly of claim 13, wherein the first and the second end stops each have an opening through which the rotatable shaft extends.

15. A vision system securable to a helmet or headgear receiver, comprising:
 a vision system housing having a first vision mount fixed to a first side of the housing, a second vision mount fixed to a second and opposing side of the housing, and an eyepiece disposed between the first and second mounts;
 a helmet mount sized to cooperate with the helmet or headgear receiver;
 an adjustment assembly coupled to the helmet mount, the adjustment assembly having a pair of parallel rails and a rotatable shaft parallel to the rails; and
 a receiver assembly having a receiver having a pair of receiver rails slidably cooperating with the rails on the adjustment assembly, a threaded portion extending parallel to the receiver rails, a first jaw and a third jaw coupled to the receiver, an actuator fixed to a second jaw and a fourth jaw and slidable in a direction generally perpendicular to the receiver rails, and a spring for biasing the second and fourth jaws towards the first and the third jaws, wherein the first vision mount may be coupled between the first jaw and the second jaw to align the eyepiece assembly with a left eye of a user and the second vision mount may be coupled between the third jaw and the fourth jaw to align the eyepiece assembly with a right eye of a user.

16. The vision system of claim 15, wherein the first and the second vision mounts are symmetrically opposed on the vision system housing for alternatively coupling the vision system on either a first or a second side of the receiver.

17. The vision system of claim 15, wherein the first, second, third, and fourth jaws have a profile that cooperates with a selected one of the first and the second vision mount on the vision system housing.

18. The vision system of claim 15, wherein the receiver has an upper lip and a lower lip extending generally perpendicular to the receiver rails.

19. The vision system of claim 15, wherein rotation of the shaft causes the vision system housing to move parallel with the pair of parallel rails to allow alignment of the eyepiece with an eye of a user wearing the vision system.

20. The vision system of claim 19, wherein the actuator travels along a line generally parallel with an optical axis of an imaging objective assembly.

* * * * *